United States Patent
Wang et al.

(10) Patent No.: US 9,075,178 B2
(45) Date of Patent: Jul. 7, 2015

(54) LUMINANCE ENHANCEMENT OPTICAL SUBSTRATES WITH ANTI-INTERFERENCE-FRINGE STRUCTURES

(71) Applicant: UBRIGHT OPTRONICS CORPORATION, Dasi Town (TW)

(72) Inventors: Kong-Hua Wang, Dasi Town (TW); Kai-Jing Wang, Dasi Town (TW); Fang-Chun Yeh, Dasi Town (TW)

(73) Assignee: UBright Optronics Corporation, Taoyuan County (TW)

( * ) Notice: Subject to any disclaimer, the term of this patent is extended or adjusted under 35 U.S.C. 154(b) by 0 days.

(21) Appl. No.: 14/171,645

(22) Filed: Feb. 3, 2014

(65) Prior Publication Data
US 2014/0254193 A1     Sep. 11, 2014

Related U.S. Application Data

(63) Continuation of application No. 12/854,815, filed on Aug. 11, 2010, now Pat. No. 8,641,259, and a continuation-in-part of application No. 11/825,139, filed on Jul. 2, 2007, now Pat. No. 7,883,647, and a (Continued)

(51) Int. Cl.
| | |
|---|---|
| *F21V 8/00* | (2006.01) |
| *G02B 5/04* | (2006.01) |
| *G02F 1/1335* | (2006.01) |

(52) U.S. Cl.
CPC .............. *G02B 6/0053* (2013.01); *G02B 5/045* (2013.01); *G02F 1/133504* (2013.01); *G02F 1/133606* (2013.01); *G02F 1/133611* (2013.01); *G02F2001/133507* (2013.01); *G02F 2001/133607* (2013.01)

(58) Field of Classification Search
CPC  G02B 6/0053; G02B 5/045; G02F 1/133606; G02F 1/133504; G02F 2001/133607; G02F 1/133611; F02F 2001/133507
USPC ............. 362/19, 26–27, 97.1–97.4, 326, 362/330–331, 558, 561, 600, 606–607, 362/617–620, 626–627, 339
See application file for complete search history.

(56) References Cited

U.S. PATENT DOCUMENTS

| | | | |
|---|---|---|---|
| 7,448,776 B2* | 11/2008 | Tang | 362/339 |
| 2001/0053075 A1* | 12/2001 | Parker et al. | 362/31 |

(Continued)

*Primary Examiner* — Anne Hines
(74) *Attorney, Agent, or Firm* — Min-Lee Teng; Litron Patent & Trademark Office

(57) ABSTRACT

An optical substrate having a structured light output surface that comprises rows of laterally arranged snaking, wavy or meandering longitudinal prism structures. The prism structures at the light output surface may be viewed as comprising rows of laterally meandering longitudinal prisms and/or sections of curved segments coupled end-to-end to form the overall meandering longitudinal prism structures. The laterally meandering rows of longitudinal prism structures are arranged in parallel laterally (side-by-side), defining parallel peaks and valleys (a facet is defined between each adjacent peak and valley). In one embodiment, the lateral waviness is regular with a constant or variable wavelength and/or wave amplitude (or extent of lateral deformation). The lateral waviness may generally follow a sinusoidal profile, or other curved profile. The structured light output surface may further include varying peak heights along each wavy prism structure and/or pre-defined structural irregularities such as non-facet flat section distributed in the structure surface.

20 Claims, 10 Drawing Sheets

Related U.S. Application Data continuation-in-part of application No. 12/455,021, filed on May 26, 2009, now Pat. No. 8,899,768, and a continuation-in-part of application No. 12/590,855, filed on Nov. 12, 2009, now Pat. No. 8,517,573, which is a continuation of application No. 11/450,145, filed on Jun. 9, 2009, now Pat. No. 7,618,164, said application No. 12/854,815 is a continuation-in-part of application No. 12/832,021, filed on Jul. 7, 2010, now Pat. No. 8,595,964, which is a continuation-in-part of application No. 12/590,855, filed on Nov. 12, 2009, now Pat. No. 8,517,573, which is a continuation of application No. 11/450,145, filed on Jun. 9, 2006, now Pat. No. 7,618,164.

(60) Provisional application No. 61/233,040, filed on Aug. 11, 2009.

(56) References Cited

U.S. PATENT DOCUMENTS

2008/0055937 A1* 3/2008 Chuang et al. ............... 362/627
2011/0181971 A1* 7/2011 Campbell et al. ............ 359/831

* cited by examiner

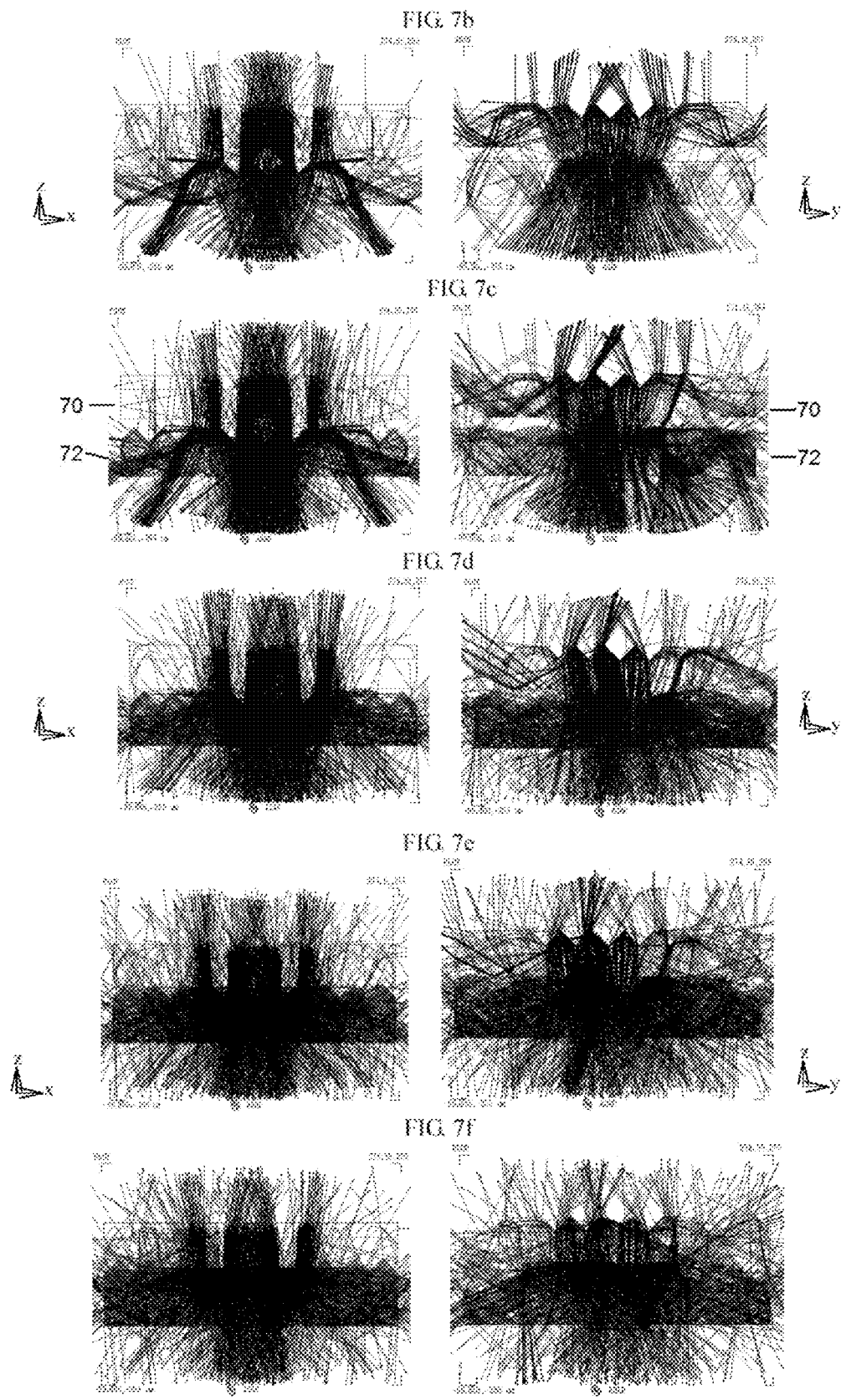

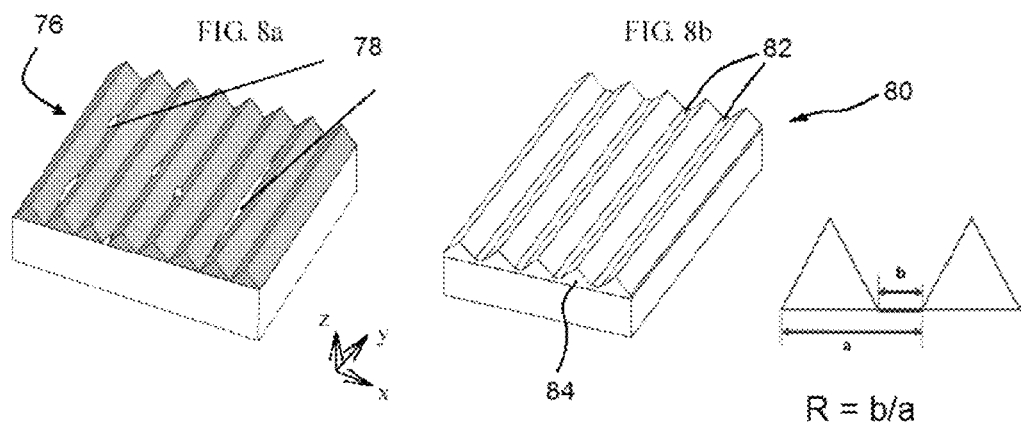
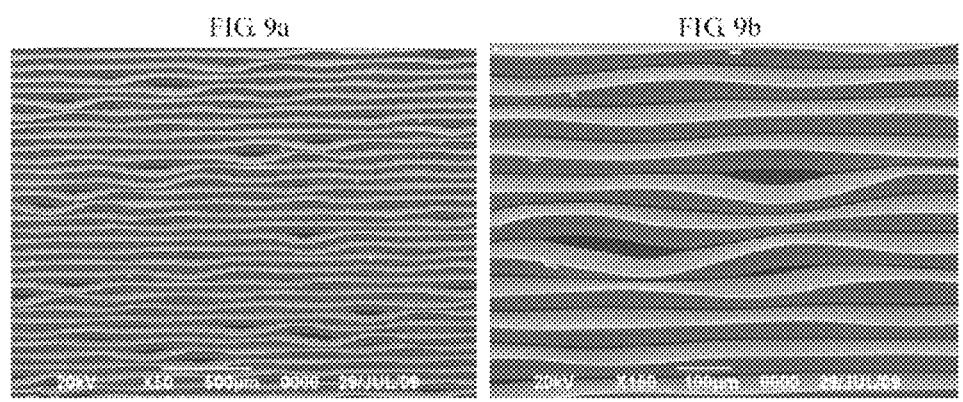

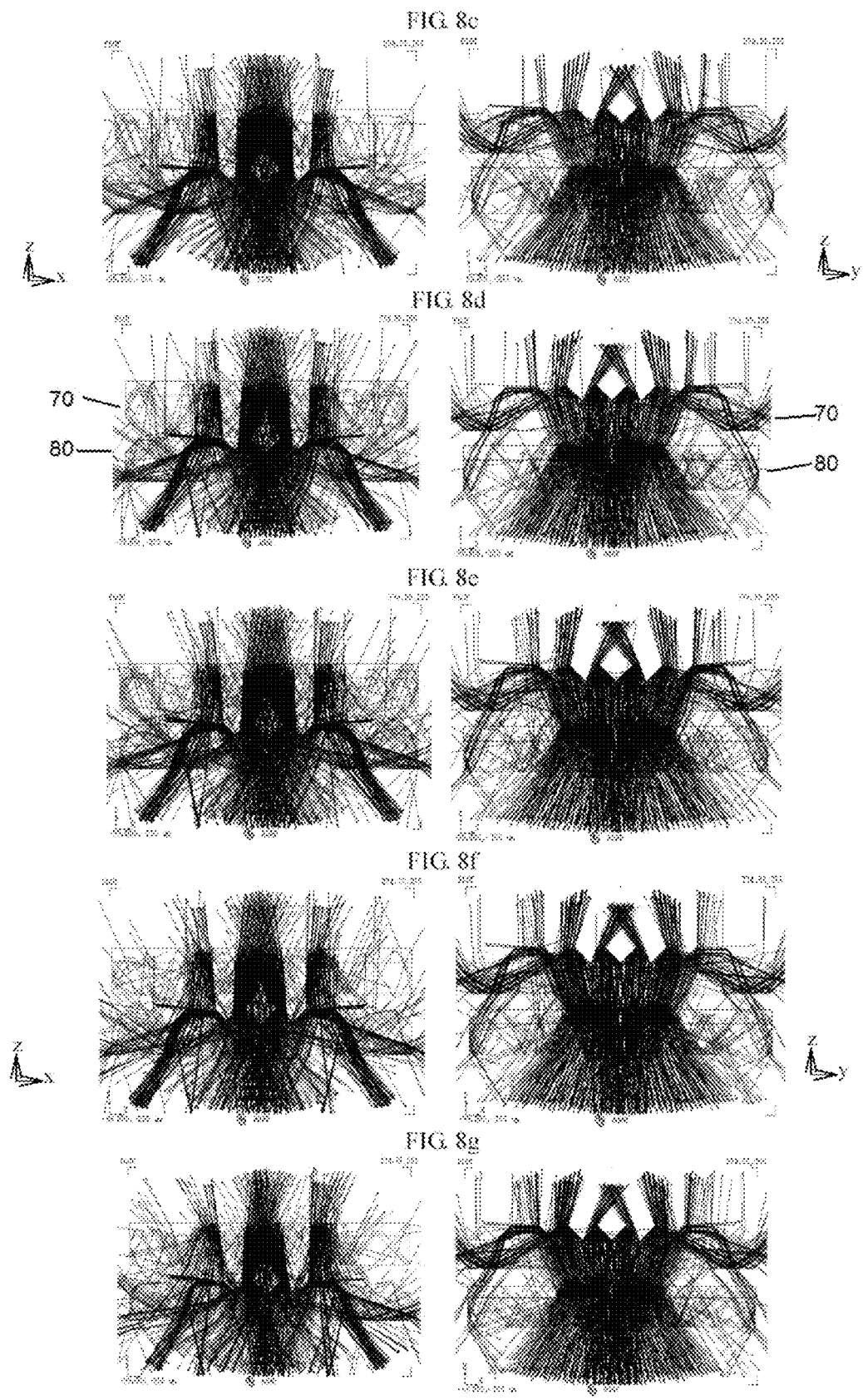

FIG. 10
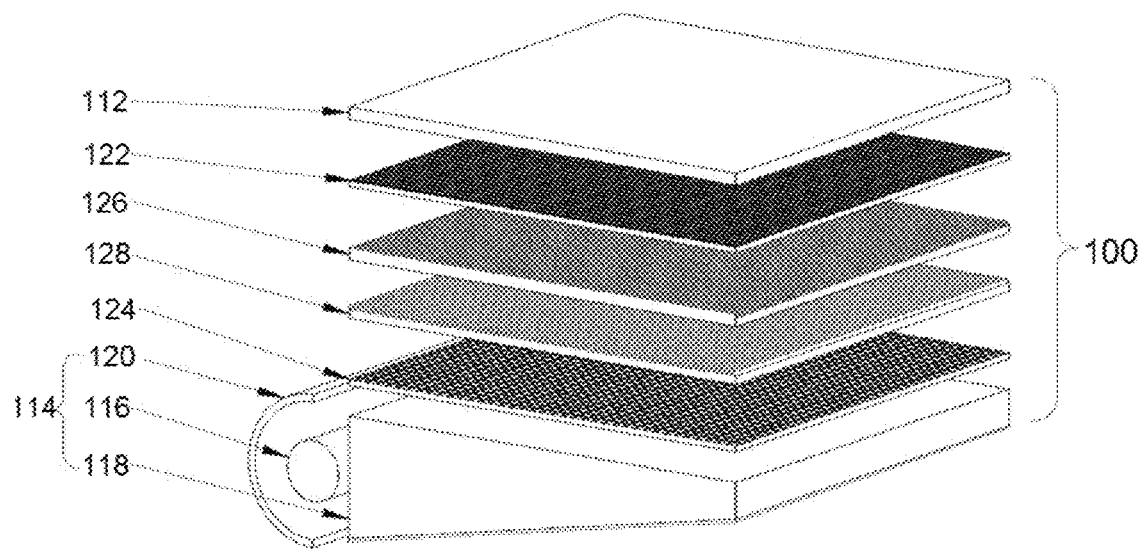
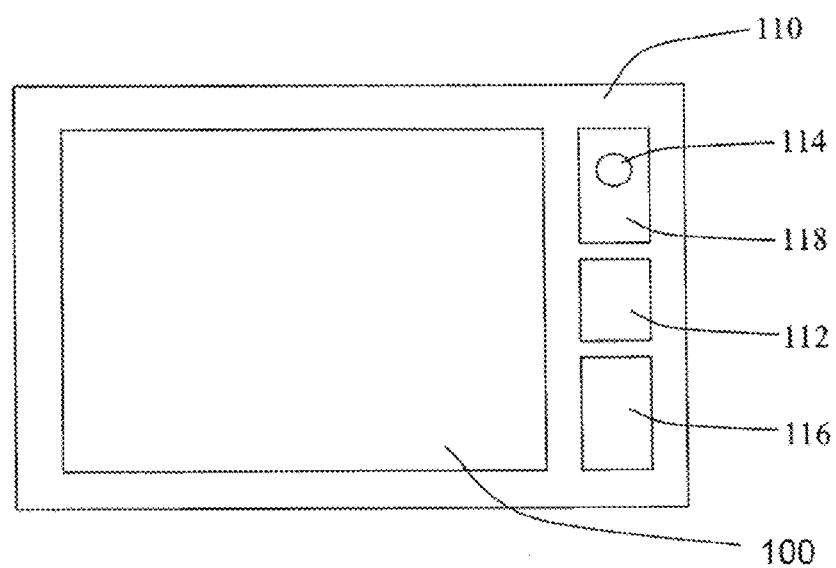
FIG. 11

LUMINANCE ENHANCEMENT OPTICAL SUBSTRATES WITH ANTI-INTERFERENCE-FRINGE STRUCTURES

CROSS-REFERENCE TO RELATED APPLICATION

This application is a continuation of U.S. patent application Ser. No. 12/854,815, filed Aug. 11, 2010, which claims priority of U.S. Provisional Application Ser. No. 61/233,040 filed on Aug. 11, 2009, and is: (a) a continuation-in-part of U.S. application Ser. No. 11/825,139 filed on Jul. 2, 2007, now U.S. Pat. No. 7,883,647; (b) a continuation-in-part of U.S. application Ser. No. 12/455,021 filed on May 26, 2009; (c) a continuation-in-part of U.S. application Ser. No. 12/590,855 filed on Nov. 12, 2009, now U.S. Pat. No. 8,517,573, which is a continuation of U.S. application Ser. No. 11/450,145, filed Jun. 9, 2006, now U.S. Pat. No. 7,618,164; and (d) a continuation-in-part of U.S. application Ser. No. 12/832,021 filed on Jul. 7, 2010, now U.S. Pat. No. 8,595,964, which is a continuation-in-part of U.S. application Ser. No. 12/590,855 filed on Nov. 12, 2009, now U.S. Pat. No. 8,517,573, which is a continuation of U.S. application Ser. No. 11/450,145, filed Jun. 9, 2006, now U.S. Pat. No. 7,618,164.

All publications noted in the present application are incorporated by reference herein as if fully set forth herein.

BACKGROUND

1. Field of Invention

The present invention relates to optical substrates having a structured surface, particularly to optical substrates for brightness enhancement, and more particularly to brightness enhancement substrates for use in flat panel displays having a planar light source.

2. Description of Related Art

Flat panel display technology is commonly used in television displays, computer displays, and displays in handheld electronics (e.g., cellular phones, personal digital assistants (PDAs), etc.). Liquid crystal display (LCD) is a type of flat panel display, which deploys a liquid crystal (LC) module having an array of pixels to render an image.

FIG. 1 illustrates an example of an LCD display (which may be modified to include the optical substrate in accordance with the present invention). A backlight LCD 10 comprises a liquid crystal (LC) display module 12, a planar light source in the form of a backlight module 14, and a number of optical films interposed between the LC module 12 and the backlight module 14. The LC module 12 comprises liquid crystals sandwiched between two transparent substrates, and control circuitry defining a two-dimensional array of pixels. The backlight module 14 provides planar light distribution, either of the backlit type in which the light source extends over a plane, or of the edge-lit type as shown in FIG. 1, in which a linear light source 16 is provided at an edge of a light guide 18. A reflector 20 is provided to direct light from the linear light source 16 through the edge of the light guide 18 into the light guide 18. The light guide is structured (e.g., with a tapered plate and light reflective and/or scattering surfaces defined on the bottom surface facing away from the LC module 12) to distribute and direct light through the top planar surface facing towards LC module 12. The optical films may include upper and lower diffuser films 22 and 24 that diffuse light from the planar surface of the light guide 18. The optical films further includes upper and lower structured surface, optical substrates 26 and 28 in accordance with the present invention, which redistribute the light passing through such that the distribution of the light exiting the films is directed more along the normal to the surface of the films. The optical substrates 26 and 28 are often referred in the art as luminance or brightness enhancement films, light redirecting films, and directional diffusing films. The light entering the LC module 12 through such a combination of optical films is uniform spatially over the planar area of the LC module 12 and has relatively strong normal light intensity. The LCD 10 may be deployed for displays, for example, for televisions, notebook computers, monitors, portable devices such as cell phones, PDAs, cameras, and the like.

There is an increasing need for reducing power consumption, thickness and weight of LCDs, without compromising display quality of the LCDs. Accordingly, there is a need to reduce power consumption, weight and thickness of backlight modules, as well as thicknesses of the various optical films. In this regard, many light directing techniques have been developed to reduce power consumption without compromising display brightness. Some developments are directed to the design of the backlight module (i.e., designing structures of the components of the backlight module 14 in FIG. 1, comprising the light source 16 and reflector 20, and light guide 18, to improve overall light output performance. In addition, other developments are directed to diffuser films 22 and 24, and luminance/brightness enhancement films 26 and 28.

In the backlight LCD 10, brightness enhancement films 26 and 28 use prismatic structures to direct light along the viewing axes (i.e., normal to the display), which enhances the brightness of the light viewed by the user of the display and which allows the system to use less power to create a desired level of on-axis illumination. Heretofore, brightness enhancement films were provided with parallel prismatic grooves, lenticular grooves, or pyramids on the light emitting surface of the films, which change the angle of the film/air interface for light rays exiting the films and cause light incident obliquely at the other surface of the films to be redistributed in a direction more normal to the exit surface of the films. The brightness enhancement films have a light input surface that is smooth, through which light enters from the backlight module. Heretofore, many LCDs used two brightness enhancement film layers (as in the LCD in FIG. 1) that are rotated about an axis perpendicular to the plane of the films, relative to each other such that the grooves in the respective film layers are at 90 degrees relative to each other, thereby collimating light along two planes orthogonal to the light output surface.

Heretofore, much effort have been undertaken to develop the structured surface of the brightness enhancement films. FIG. 2 illustrates the structures of various prior art brightness enhancement films. The light output surfaces of the brightness enhancement films (the top surface as shown in the figures) are structured, and the light input surfaces (the bottom surface as shown in the figures) are flat and smooth (e.g., glossy). When the brightness enhancement films are used in LCDs, with the glossy bottom surface of a brightness enhancement film above the structured surface of another brightness enhancement film, it has been experienced that the optical interaction between the glossy surface of top enhancement film and the structured surface and/or glossy surface of the lower brightness enhancement film creates undesirable visible artifacts in the display image in the form of interference fringes (i.e., bright and dark repeated patterns) that are observable in the display image. Undesirable image affecting effects arising from interference fringes, physical defects, flows, stains and non-uniformities, etc., can be masked by using an upper diffuser film (e.g., diffuser film 22 above brightness enhancement film 26 in FIG. 1).

Heretofore, to reduce the overall thickness of the optical films in LCDs, much effort had been directed to reducing the number of the optical films, from four films (e.g., optical films 22, 24, 26 and 28 in FIG. 1) to three films. In this regard, typically the low diffuser film 24 and low brightness enhancement film 28 are maintained as separate structures, but the functions of the top diffuser film 22 and top brightness enhancement film 26 are combined and merged into a single hybrid film structure. The three-film type display has been widely adopted in handheld electronic devices and notebooks, where it is particularly desirable to push the envelope to reduce overall size of such devices.

Various efforts have been undertaken to develop hybrid brightness enhancement films. Referring to FIG. 3, U.S. Pat. No. 5,995,288 disclosed a coating layer of particles provided on the underside of the optical substrate, on the opposite side of the substrate with respect to the structured surface on the top side. Referring to FIG. 4, U.S. Pat. No. 5,598,280 disclosed a method to form small projections the underside of the optical substrate to improve uniformity in luminance. Others have explored modifying the structure of prism surface of the structured surface of the optical substrate. For example, referring to FIG. 5B, U.S. Pat. No. 6,798,574 provides fine protrusions on the prism surface of the structured surface of the optical substrate, which is supposed to diffuse light in a certain direction with a wider angle.

However, the above-mentioned hybrid brightness enhancement films involve relatively complex structures requiring relatively higher manufacturing costs. Moreover, the hybrid brightness enhancement films are also less effective in directing light within the desirable viewing angle.

Furthermore, in the absence of a separate top diffuser film between the structured surface of the top hybrid brightness enhancement film and the underside of the LC module, undesirable interference fringes appearing as bright and dark patterns may be generated. It is known that the top structures on the brightness enhancement film and the pixel array in the LC module could create interference fringes or moiré patterns as well.

There remains a need for a cost effective optical substrate that provides a surface structure that enhances brightness and reduces interference fringes, whether used with another brightness enhancement film or a LC module.

SUMMARY OF THE INVENTION

The present invention is directed to an optical substrate that possesses a structured surface that enhances luminance or brightness and reduces interference fringes in the display images. In one aspect of the present invention, the optical substrate is in the form of a film, sheet, plate, and the like, which may be flexible or rigid, having a structured light output surface that comprises rows of laterally arranged snaking, wavy or meandering longitudinal prism structures. In one embodiment, the prism structures at the light output surface may be viewed as comprising rows of laterally meandering longitudinal prisms and/or sections of continuous curved segments (i.e., sections with a curve in a particular direction, or generally C-shaped curve sections) coupled end-to-end to form the overall meandering longitudinal prism structures. In one embodiment, the laterally meandering rows of longitudinal prism structures are arranged in parallel laterally (side-by-side), defining parallel peaks and valleys (a facet is defined between each adjacent peak and valley). In one embodiment, the lateral waviness is regular with a constant or variable wavelength and/or wave amplitude (or extent of lateral deformation). The lateral waviness may generally follow a sinusoidal profile, or other curved profile. In another embodiment, the lateral waviness may be of random wavelength and/or wave amplitude. In one embodiment, the peaks are of constant or similar height and/or the valleys are of constant or similar depth, across the plane of the substrate. The pitch between adjacent peaks/valleys may be constant across a particular cross-sectional plane. In one embodiment, the optical substrate includes a non-structured, smooth, planar, or glossy light input surface. In one embodiment, the light output surface and the light input surface are generally parallel to each other in the overall optical substrate structure (i.e., do not form an overall substrate structure that is generally tapered).

In another embodiment, the structured light output surface further includes varying peak heights along each wavy prism structure in the structured surface.

In a further embodiment, the structured light output surface further includes, with or without varying peak heights, pre-defined structural irregularities distributed in the structure surface. The pre-defined irregularities introduced may be in-kind to the anticipated structural defects, such as non-facet flat sections in the prism structure of the structured surface.

The optical substrate may have a base portion, which may be a separate layer from a layer bearing the structured surface, or is unitary or monolithic to the prism structure of the structured surface. The base portion provides the necessary thickness to provide structural integrity to the final luminance enhancement film.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 7b-7f represent simulations of optical diffusion effects along two orthogonal vertical planes of the optical substrate with varying heights.

FIG. 8a is a schematic perspective view of a structured surface with distributed predefined irregularities, in accordance with another embodiment of the present invention; FIG. 8b is a schematic perspective view of a structured surface with distributed predefined irregularities, in accordance with yet another embodiment of the present invention; FIGS. 8c-8g represent simulations of optical diffusion effects along two orthogonal vertical planes of the optical substrate with distributed pre-defined irregularities.

FIGS. 9A to 9B illustrate SEM photos of prototype optical substrates having wavy prisms and distributed predefined irregularities in accordance with a further embodiment of the present invention.

FIG. 10 schematically illustrates the structure of a LCD having an optical substrate, which incorporate the optical substrate in accordance with one embodiment of the present invention.

FIG. 11 is a schematic view of an electronic device comprising an LCD panel that incorporates the inventive optical substrate of the present invention, in accordance with one embodiment of the present invention.

DETAIL DESCRIPTION OF THE ILLUSTRATED EMBODIMENTS

Figure 1:
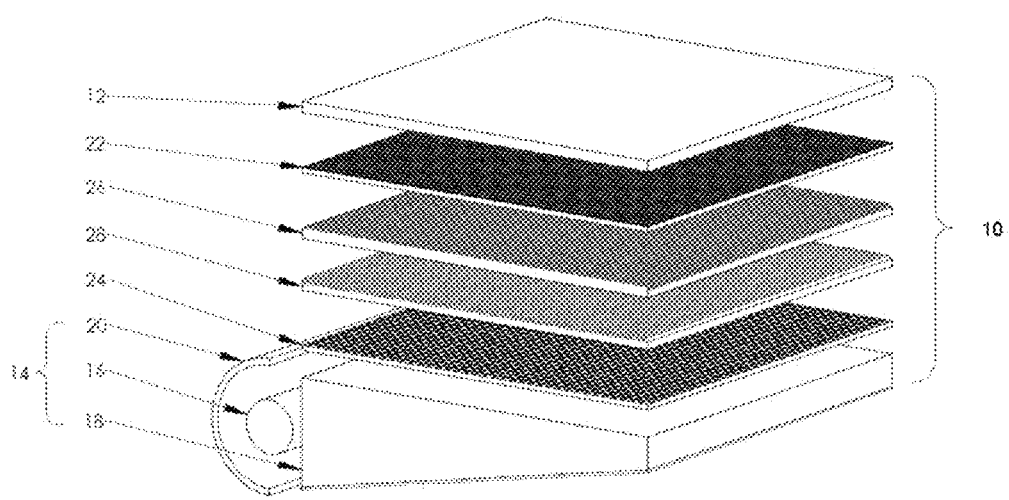
FIG. 1 schematically illustrates the structure of a prior art LCD.
Figure 2A:
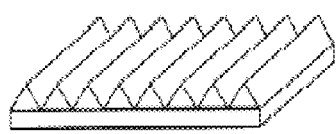
FIGS. 2A-C illustrate prior art optical substrates having different surface structures.
Figure 2B:
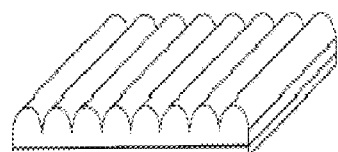
Figure 2C:
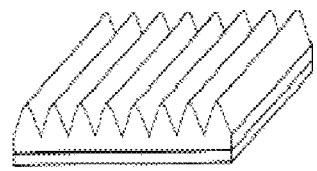
Figure 3:
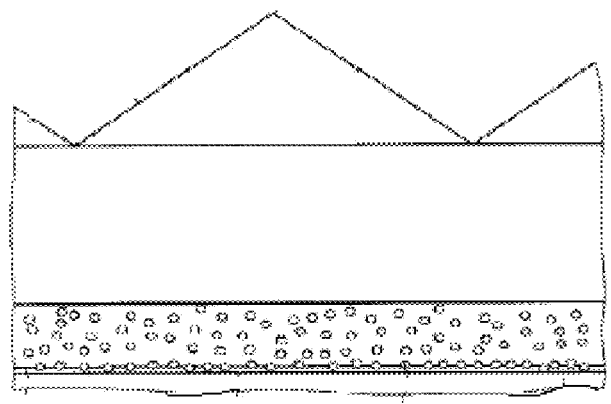
FIGS. 3 to 5B illustrate prior art hybrid brightness enhancement optical substrates.
Figure 4:
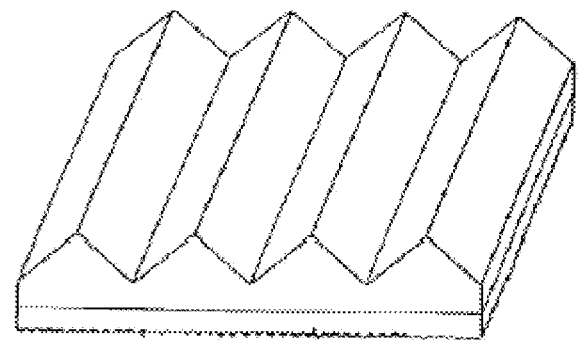
Figure 5A:
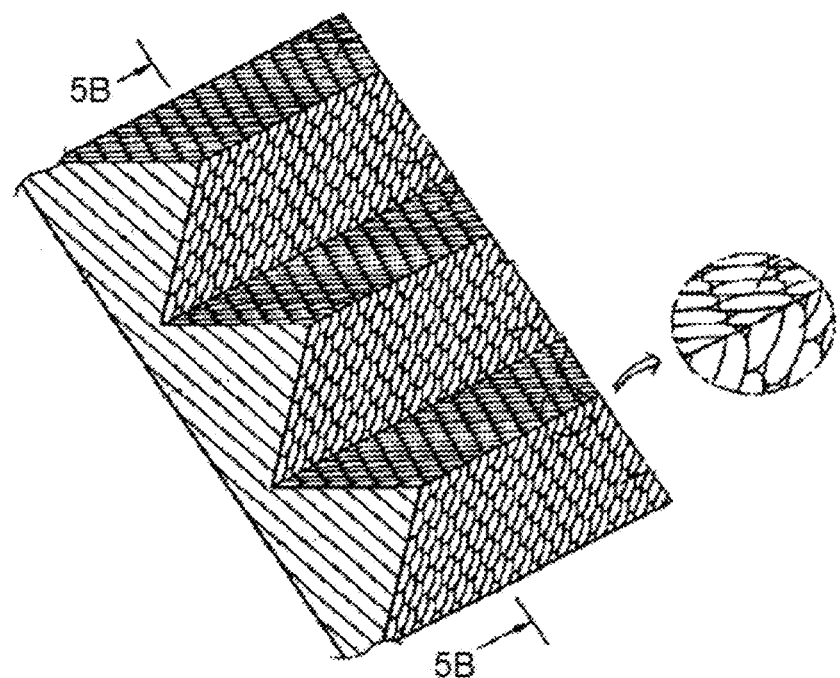
Figure 5B:
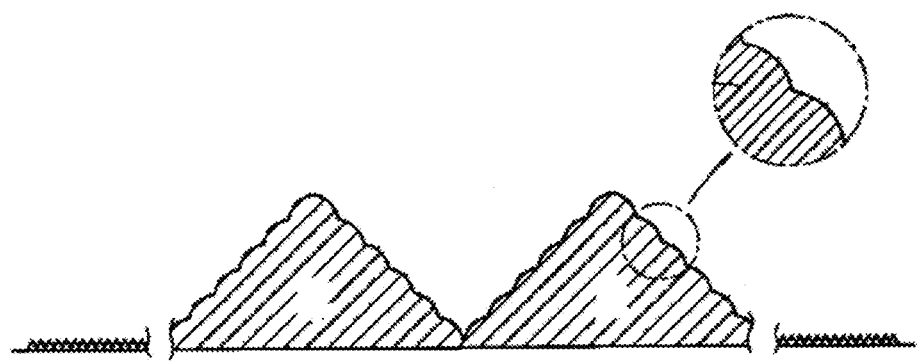

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by referenced to the appended claims.

The present invention is directed to an optical substrate that possesses a structured surface that enhances luminance or brightness and reduces interference fringes in the display images. In one aspect of the present invention, the optical substrate is in the form of a film, sheet, plate, and the like, which may be flexible or rigid, having a structured light output surface that comprises rows of laterally arranged snaking, wavy or meandering longitudinal prism structures.

In the context of the present invention, the inventive optical substrate may be adopted in display devices having display panels that may be flat or curved, and rigid or flexible, which comprise an array of display pixels. Planar light source refers to a light source that provides illumination to cover an area of the array of display pixels. Accordingly, for display panels having a curved image plane of display pixels (such panels may be rigid or flexible), the backlight would cover the array of display pixels in the curved plane, to effectively provide illumination coverage to the curved image plane.

The present invention will be further described below in connection with the illustrated embodiments.

FIG. 10 illustrates an example of a flat panel display. A backlight LCD 100, in accordance with one embodiment of the present invention, comprises a liquid crystal (LC) display module 112, a planar light source in the form of a backlight module 114, and a number of optical films interposed between the LC module 112 and the backlight module 114. The LC module 112 comprises liquid crystals sandwiched between two transparent substrates, and control circuitry defining a two-dimensional array of pixels. The backlight module 114 provides planar light distribution, either of the backlit type in which the light source extends over a plane, or of the edge-lit type as shown in FIG. 10, in which a linear light source 116 is provided at an edge of a light guide 118. A reflector 120 is provided to direct light from the linear light source 116 through the edge of the light guide 118 into the light guide 118. The light guide is structured (e.g., with a tapered plate and light reflective and/or scattering surfaces defined on the bottom surface facing away from the LC module 112) to distribute and direct light through the top planar surface facing towards LC module 112. The optical films may include optional upper and lower diffuser films 122 and 124 that diffuse light from the planar surface of the light guide 118. It is noted that while two diffuser films are shown in FIG. 10, given the optical diffusion characteristic of the inventive optical substrates disclosed in greater detail below, at least the upper diffuser film 122 would not be necessary, in one embodiment of the present invention. The lower diffuser 124 may also be omitted. This would reduce the overall thickness of the LCD 100. It is noted that a diffuser film or layer is distinguishable from an optical substrate for brightness enhancement (i.e., brightness or luminance enhancement film discussed below), in that the diffuser film does not have prismatic structures. Diffuser film scatters and spreads light, instead of directing light to enhance luminance in a direction out of the display. The optical substrate of the present invention has prismatic structures, which are configured to both diffuse light and enhance luminance.

Figure 6A:
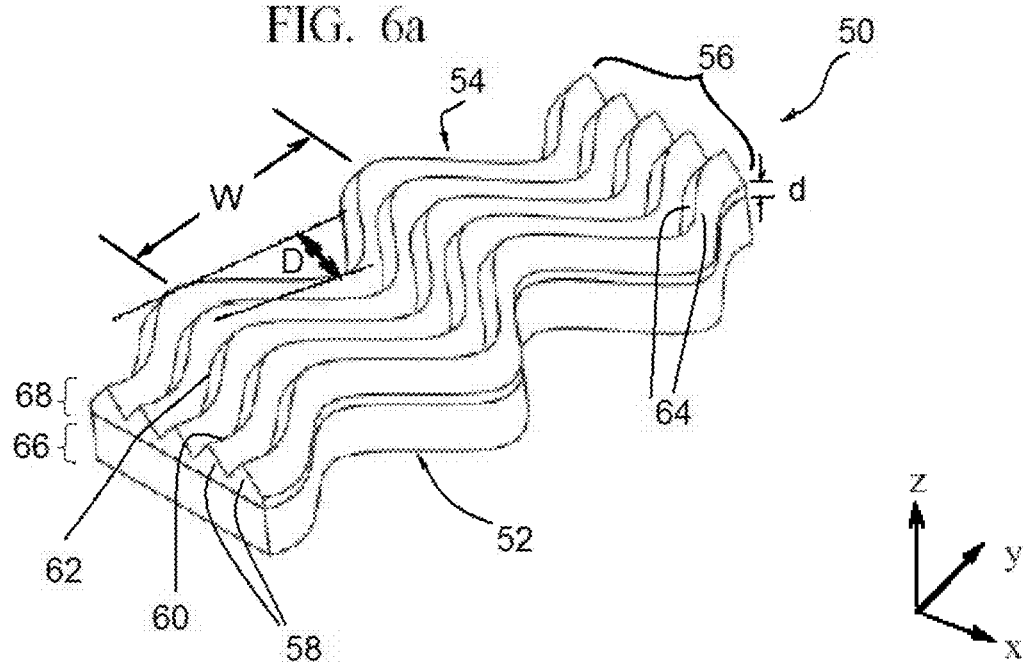
FIG. 6a is a schematic perspective view of an optical substrate having a structured surface, in accordance with one embodiment of the present invention.

Specifically, the optical films shown in FIG. 6a further include one or more structured surface optical substrates in accordance with the present invention, which diffuse light as well as redistribute the light passing through such that the distribution of the light exiting the films is directed more along the normal to the surface of the films. In the illustrated embodiment, there are two structured optical substrates 126 and 128 (which may be similar in structure) in accordance with the present invention, which are arranged with the longitudinal prism structures generally orthogonal between the two substrates. The structured optical substrates 126 and 128 are structured to diffuse light as well as enhance luminance or brightness, redirecting light out of the display. The light entering the LC module 112 through such a combination of optical films is uniform spatially over the planar area of the LC module 112 and has relatively strong normal light intensity. The structured optical substrate 126 and 128 obviate the need for a separate diffuser sheet between the LC module 112 and the upper structured optical substrate 126. Further, the structured optical substrates 126 and 128 in accordance with the present invention would reduce interference fringe from being created between the substrates, and between the upper substrate and the adjacent LC module 112. Alternatively, only one of the optical substrates 126 and 128 need to be structured in accordance with the present invention (e.g., only the lower optical substrate 128), to provide acceptable interference fringe level and optical diffusion effect.

The optical substrates in accordance with the present invention may be used with LCDs to be deployed for displays, for example, for televisions, notebook computers, monitors, portable devices such as cell phones, digital cameras, PDAs and the like, to make the displays brighter.

While the backlight module 114 is shown with a light source 116 placed at an edge of the light guide plate 118, the backlight module may be of another light source configuration, such as an array of LEDs positioned at an edge of a light guide, or a planar array of LEDs in place of the light guide plate, without departing from the scope and spirit of the present invention.

FIG. 6a illustrates the structure of an optical substrate 50 in accordance with one embodiment of the present invention, which can be used as the structured optical substrate 126 and/or 128 in FIG. 10. The optical substrate 50 has a light input surface 52 and a structured light output surface 54 that includes prismatic structures that may be viewed as comprising parallel rows 56 of laterally meandering continuous longitudinal prisms 58. The longitudinal prisms 58 meander laterally in substantially smooth curves. In an alternate embodiment (not shown), curved segments (i.e., a section with a curve in a particular direction, or a C-shaped curve section) are coupled end-to-end, which form the overall meandering longitudinal prism structures. In the illustrated embodiment, the light input surface 52 is non-structured, smooth, planar, and/or glossy. It is understood that the light input surface 52 may be textured (e.g., a frosted or matte finish, or particles dispersed at the surface; see U.S. patent application Ser. No. 12/832,021, filed Jul. 7, 2010, which is fully incorporated by reference herein). In the illustrated embodiment, the light output surface and the structured light input surface are generally parallel to each other in the overall optical substrate structure (i.e., do not form an overall substrate structure that is generally tapered like a light guide plate in a backlight module, or that is concave or convex).

In the embodiment of FIG. 6a, the laterally meandering rows 56 of longitudinal prisms 58 are arranged in parallel laterally (side-by-side), defining parallel peaks 60 and valleys 62. A wavy facet is defined between each adjacent peak 60 and valley 62. In the illustrated embodiment of FIG. 6a, the lateral waviness is regular with a constant wavelength and/or wave amplitude (i.e., extent of lateral deformation), generally following a sinusoidal profile. The lateral waviness may follow other curved profiles, which may be irregular and/or random in wavelength and/or wave amplitude (or lateral deformation) (see the embodiment shown in FIG. 9). The peak vertex angle may be right angled, and the peaks are of constant or similar height and/or the valleys are of constant or similar depth, across the plane of the substrate. The prisms 58 each has a constant sectional profile in the x-z plane. In other embodiments, the lateral waviness may be irregular, further with a variable wavelength and/or wave amplitude.

The distance or pitch between adjacent peaks/valleys is constant across a particular x-z sectional plane. In this embodiment, the light output surface and the structured light input surface are generally parallel to each other in the overall optical substrate structure (i.e., do not form an overall substrate structure that is generally tapered like a light guide plate in a backlight module, or that is concave or convex).

For ease of reference, the following orthogonal x, y, z coordinate system will be adopted in explaining the various directions. As shown in FIG. 6a, the x-axis is in the direction across the peaks and valleys, also referred to as the lateral or transverse direction. The y-axis is orthogonal to the x-axis, in a generally longitudinal direction of the prisms 58. The longitudinal direction of prisms would be in reference to the general direction in which the peaks 60 proceed from one end to another end of the prisms 58, wherein the prisms meander about the y-axis. The light input surface 52 lies in an x-y plane. For a rectangular piece of the optical substrate, the x and y-axes would be along the orthogonal edges of the substrate. The z-axis is orthogonal to the x and y-axes. The edge showing the ends of the laterally arranged meandering rows 56 of prisms 58 blocks lies in the x-z plane, such as shown in FIG. 6a, which also represents a sectional view in the x-z plane. References to cross sections of prisms 58 would be sections taken in x-z planes, at various locations along the y-axis. Further, references to a horizontal direction would be in an x-y plane, and references to a vertical direction would be in the z-direction.

In the illustrated embodiment, the substrate 50 comprises two separate layers, wherein the top structured surface layer 68 has the structured light output surface 54, and the bottom base layer 66 has the planar light input surface 52. The two layers are adhered together to form the substrate 50. It can be appreciated that the substrate may be formed from a single integrated physical layer of material, instead of two separate physical layers, without departing from the scope and spirit of the present invention. The optical substrate 50 may be a unitary or monolithic structure including a base portion integral to the prism structures that define the structured surface.

In the illustrated embodiment, the structured surface layer 68 and the base layer 66 are made of different materials. The structured surface layer 68 may be formed using an optically transparent material, preferably a polymerizable resin, such an ultraviolet or visible radiation-curable resin. Generally, the structured surface 54 is formed by applying a coatable composition comprising a polymerizable and crosslinkable resin onto a master mold or master drum and undergoing a hardening process. The base layer 66 may be made of PET (polyethylene terephthalate) material, but may be made from the same transparent material as the structured layer 68. The base layer 66 provides the necessary thickness to provide structural integrity to the final optical luminance enhancement film.

Figure 7A:
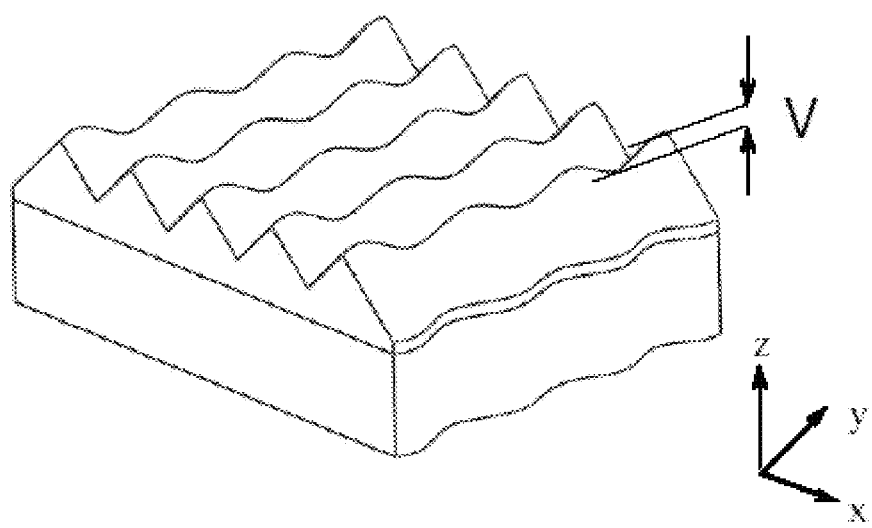
FIG. 7a is a schematic perspective view of a structured surface with varying peak heights, in accordance with another embodiment of the present invention.
Figure 6B:
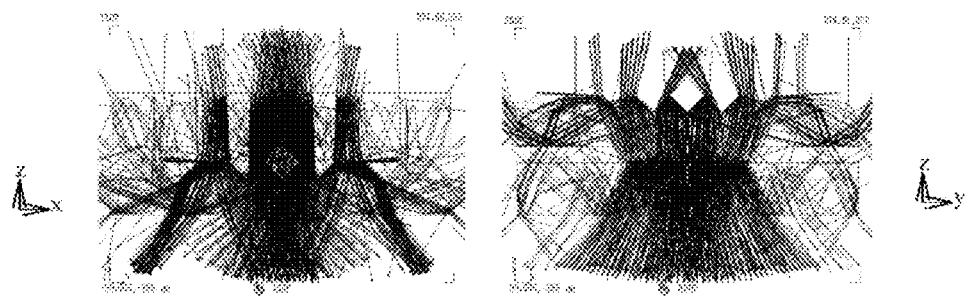
FIGS. 6b-6f represent simulations of optical diffusion effects along two orthogonal vertical planes of the optical substrate, at various degrees of lateral waviness.
Figure 6C:
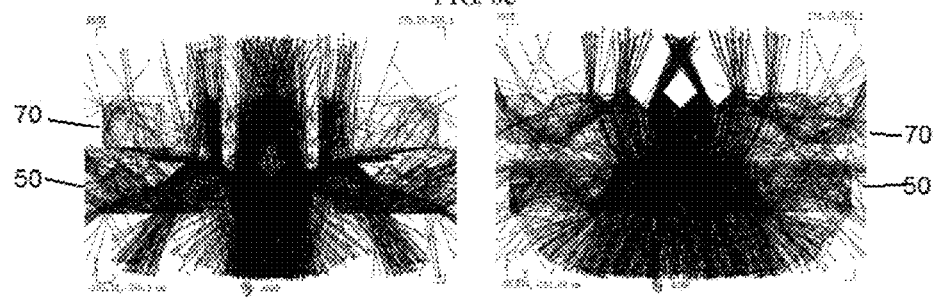
Figure 6D:
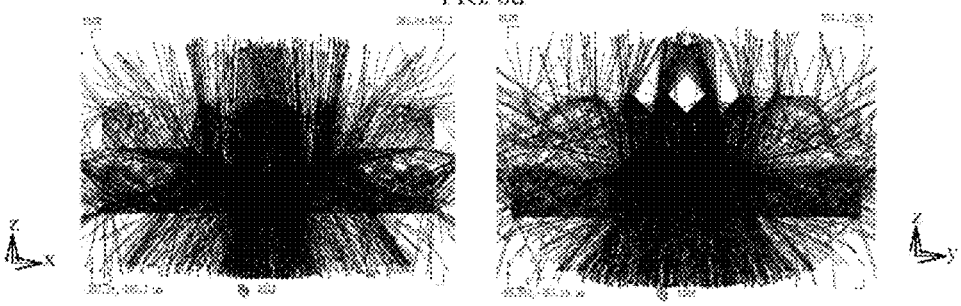
Figure 6E:
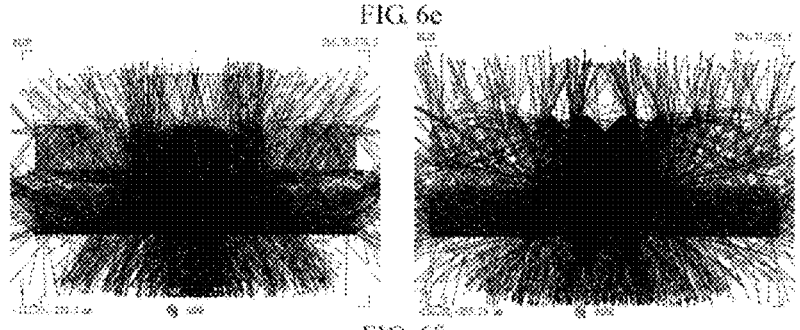
Figure 6F:
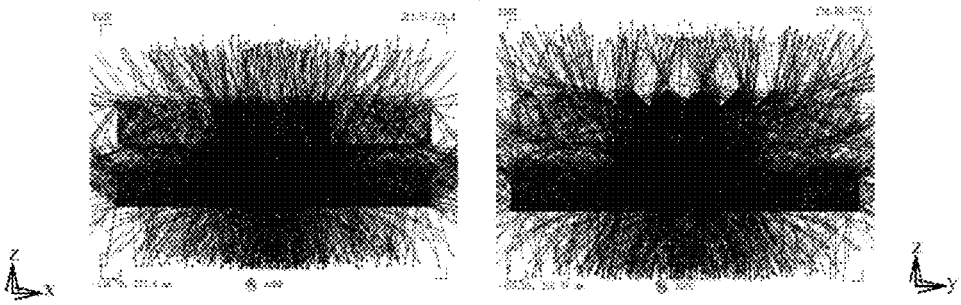

The dimensions of the structured surface are generally as follows, for example:
Thickness of base layer=tens of micrometers to several millimeters
Peak height (as measured from the top of base layer)=tens to hundreds of micrometers
Distance of valley bottom from top of base layer=about 0.5 to hundreds of micrometers
Vertex angle of peaks=about 70 to 110 degrees
Pitch between adjacent peaks=tens to hundreds of micrometers
Wavelength W of lateral wavy prisms=tens of micrometers to several millimeters
Lateral deformation D (i.e., twice amplitude of lateral wavy prisms)=several to hundreds of micrometers In another embodiment, the structured light output surface of optical substrate further includes varying peak heights along each wavy prism structure in the structured surface, in addition to the laterally wavy prism structure (see FIG. 13; see also FIG. 7a). The peak height may vary in an orderly, semi-orderly, random, and quasi-random manner. FIG. 7a illustrates peak variations in a regular, orderly manner, following a generally sinusoidal waveform.

In a further embodiment, the structured light output surface further includes, with or without varying peak heights, pre-defined structural irregularities distributed in the structure surface. The pre-defined irregularities introduced may be in-kind to anticipated structural defects arising from manufacturing, such as non-facet flat sections in the prism structure (e.g., at peaks or valleys) of the structured surface (see FIG. 9 and FIG. 13; see also FIG. 8a). The structural irregularities are distributed across the structured light output surface in at least one of orderly, semi-orderly, random, and quasi-random manner. The predefined irregularities introduced into the structured light output surface could mask certain user perceivable defects caused by structural defects that have been unintentionally included in the structured light output surface from the manufacturing process. Further reference to the defect masking effect of predefined structural irregularities may be made to U.S. application Ser. No. 11/825,139 filed on Jul. 2, 2007, which has been fully incorporated by reference herein.

Computer Simulation of Optical Diffusion Effects

Computer simulation model have been undertaken for trend analysis of optical diffusion effects, comprising only two crossed brightness enhancement optical substrates in accordance with the present invention. Generally, for purpose of trend analysis, as more fully detailed below, only one of the substrates is structured with the wavy prism, varying prism peak heights or flat irregularities. With only one of the two substrates as structure, the effect of the structured surfaces would be more easily determined. The upper substrate is structured with straight triangular prisms on one side, and a glossy or smooth surface on the other side. The lower substrate is structured using only one of wavy prism, varying prism peak heights and flat irregularities. The structured surface of the lower substrate is adjacent to the glossy side of the upper substrate, and the other side of the lower substrate is glossy or smooth. The light source inputs from the smooth light input surface of the lower substrate. The simulation model is thus simplified and used to get the optical diffusion distribution trend of output light from the upper substrate. No reflector, light guide or other components has been specifically considered.

Figure 12:
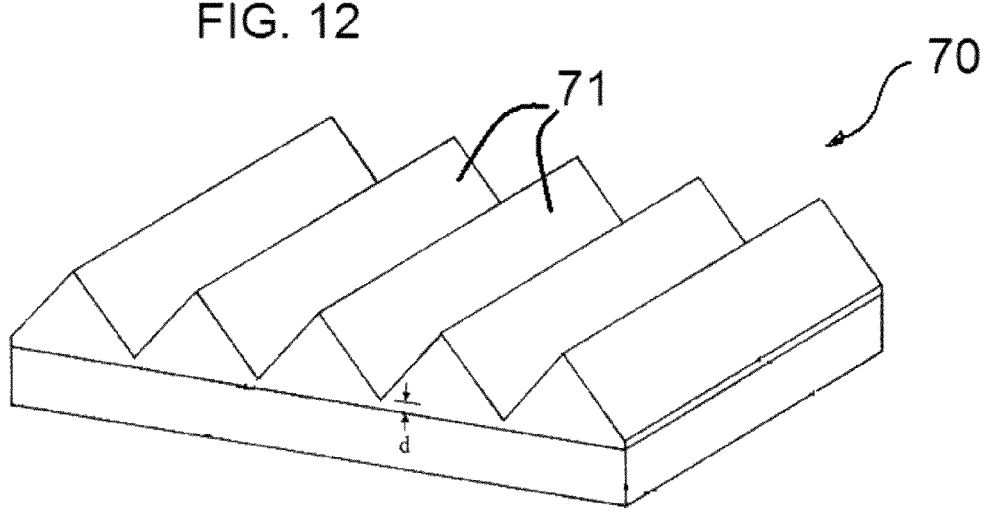
FIG. 12 is a schematic perspective view of an optical substrate having an array of lateral row of uniform regular prisms.

Computer simulations have been conducted to investigate the optical diffusion effects along the x-z plane and the y-z plane of optical substrates 50 having different degree of waviness (i.e., different degrees of lateral deformation D) at a constant wavelength W of 100 µm. The simulations were conducted with a combination of an upper optical substrate 70 (see FIG. 12) having an array of lateral rows of straight, uniform, regular prisms 71, and a lower optical substrate having the structure of the optical substrate 50, wherein the upper substrate 70 and the lower substrate 50 are rotated 90 degrees about the z-axis, so that the x-axis of the upper substrate 70 is aligned with the y-axis of the lower substrate 50. The underside of the upper substrate 70 that faces the structured surface of the lower substrate 50 is smooth. The upper substrate 70 has peaks that are 50 µm in pitch and 90 degrees in vertex angle. The lower substrate has similar peak pitch and vertex angle. Lambertian light is directed to the light input surface at the bottom of the lower substrate. With only one of the two optical substrates as structured with lateral wavy prism structures (or varying peak heights and flat irregularities in the other simulations), the optical diffusion effect of the film structures would be more easily determined.

FIGS. 6b to 6f respectively represents the results of the simulations with lower optical substrates 50 having wavy prisms of a constant wavelength W=100 µm and deformations D=0, 10, 20, 30 and 40 µm. The left side of FIGS. 6b to 6f represents the optical diffusion effects along the x-z plane of the lower substrate 50 having the inventive prism structure shown in FIG. 6a; the right side of FIGS. 6b to 6f represents the optical diffusion effects along the y-z plane of the lower substrate 50 having the inventive wavy prism structures shown in FIG. 6a. Based on simulation results, one can see a clear trend in the optical diffusion effects, wherein the diffused output light distribution from the upper substrate 70 significantly improves in uniformity with higher deformation D. The simulation results show that the diffused light from output surface is increased rapidly along both x and y directions with increasing transverse deformations D. The output light is diffused more in lateral or transverse direction (x-z plane) than that in the longitudinal direction (y-z plane). With deformation D=0 (FIG. 6b), the output light is more concentrated and significantly less diffused.

For purpose of simulation trend analysis of the effect of vary peak heights, FIG. 7a schematically illustrates an optical substrate 72 having only varying peak heights along each straight longitudinal prism structure. The peak height of the prisms varies with variance V.

Computer simulations have been conducted to investigate the optical diffusion effects along the x-z plane and the y-z plane of optical substrates 72 having different degrees of peak height variance V. As in the previous embodiment, the simulations were conducted with a combination of an upper optical substrate 70 (see FIG. 12) having an array of lateral rows of straight, uniform, regular prisms 71, and a lower optical substrate having the structure of the optical substrate 72, wherein the upper substrate 70 and the lower substrate 72 are rotated 90 degrees about the z-axis, so that the x-axis of the upper substrate 70 is aligned with the y-axis of the lower substrate 72. The simulation conditions are otherwise similar to the previous simulations in FIGS. 6b to 6f. The underside of the upper substrate 70 that faces the structured surface of the lower substrate 72 is smooth. The upper substrate 70 has peaks that are 50 µm in pitch and 90 degrees in vertex angle. The lower substrate 72 has similar peak pitch and vertex angle. Lambertian light is directed to the light input surface at the bottom of the lower substrate.

FIGS. 7b to 7f respectively represents the results of the simulations with lower optical substrates 72 having peak height variances V=0, 10, 20, 30 and 40 µm. The left side of FIGS. 7b to 7f represents the optical diffusion effects along the x-z plane of the lower substrate 72 having the inventive prism structure shown in FIG. 7a; the right side of FIGS. 7b to 7f represents the optical diffusion effects along the y-z plane of the lower substrate 72 having the inventive prism structure shown in FIG. 7a. Based on the simulation results, one can see that the optical diffusion effects do not change significantly with increasing peak height variance V, wherein the diffused output light distribution from the upper substrate 70 increased only slightly in uniformity with higher peak height variance V. The simulation results show that the diffused light from output surface does not change significantly along both x and y directions with increasing peak height variance V. The output light remains concentrated and less diffused with changes in peak height variance V.

However, for purpose of simulation trend analysis of the effect of flat irregularities, FIG. 8a schematically illustrates an optical substrate 76 having only predefined irregularities 78 distributed in the prism structure of optical substrate 76. In order to simplify the simulation model, the structure is relocated as straight regular longitudinal prisms 84 with flat gaps 82 between adjacent prisms 84. The ratio R of b to a (shown in FIG. 8b) is used to control the area percentage of the flat irregularities to whole area. FIGS. 8c to 8g exhibit the trend of optical diffusion effects of structures with ratio R=0, 2.5, 5, 10 and 20% respectively.

Computer simulations have been conducted to investigate the optical diffusion effects along the x-z plane and the y-z plane of optical substrates 80 having different degree of ratio R. As in the previous embodiment, the simulations were conducted with a combination of an upper optical substrate 70 (see FIG. 12) having an array of lateral rows of straight, uniform, regular prisms 71, and a lower optical substrate having the structure of the optical substrate 80, wherein the upper substrate 70 and the lower substrate 80 are rotated 90 degrees about the z-axis, so that the x-axis of the upper substrate 70 is aligned with the y-axis of the lower substrate 80. The simulation conditions are otherwise similar to the previous simulations in FIGS. 6b to 6f. The underside of the upper substrate 70 that faces the structured surface of the lower substrate 50 is smooth. The upper substrate 70 has peaks that are 50 µm in pitch and 90 degrees in vertex angle.

The lower substrate 80 has similar peak pitch and vertex angle. Lambertian light is directed to the light input surface at the bottom of the lower substrate.

FIGS. 8c to 8g respectively represents the results of the simulations with lower optical substrates 80 having ratio R=0, 2.5, 5, 10 and 20%. The left side of FIGS. 8c to 8g represents the optical diffusion effects along the x-z plane of the lower substrate 80 having the inventive prism structure shown in FIG. 8b; the right side of FIGS. 8c to 8g represents the optical diffusion effects along the y-z plane of the lower substrate 80 having the inventive prism structure shown in FIG. 8b. Based on the simulation results, one can see that the optical diffusion effects do not change appreciably with increasing ratio R, wherein the diffused output light distribution from the upper substrate 70 hardly change in uniformity with higher ratio R. The simulation results show that the diffused light from output surface does not change appreciably along both x and y directions with increasing ratio R. The output light remains at same level of being concentrated and less diffused with changes in ratio R.

Based on the foregoing trend analysis for the different approaches of wavy prisms, peak height variation, and flat irregularities, wherein each approach is considered alone separately, the following optical diffusion effects were observed. The overall diffused light from the output surface of the upper optical substrate is rapidly increased while increasing the transverse deformation D of the wavy prisms. The overall diffused light from the output surface of the upper optical substrate is increased slightly while increasing the peak height variance V. Accordingly, the transverse deformation D of the wavy prisms has a more significant effect on diffusing light. Ratio R of flat irregularities has least influence compared with transverse deformation and peak height variance. Given the foregoing diffusion analysis, one can anticipate the effects of combining the different approaches to reduce interference-fringes without compromising diffusion.

The foregoing simulations did not consider the effect of randomly or regularly arranging a combination of different degrees of transverse deformation D, peak height variance V and ratio R of flat regularities. All the simulated structures are parallel between prisms. It is reasonable to predict that the diffusion effects will be enhanced, if the transverse deformation D, peak height variance V and ratio of flat irregularities R are appropriately applied in location and magnitude.

Experimental Results

Figure 13:
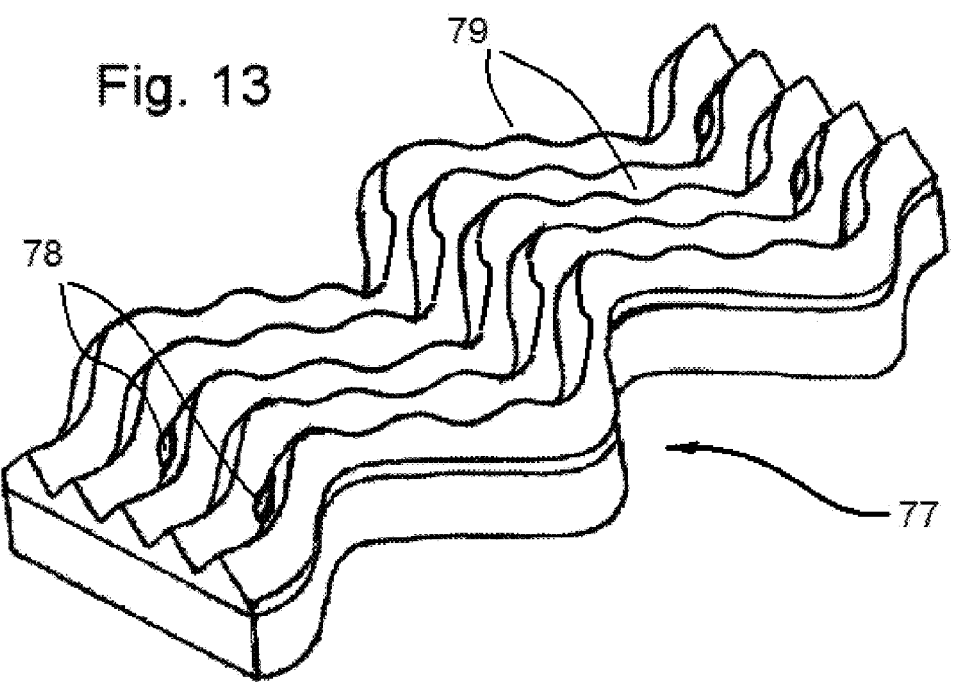
FIG. 13 is a schematic perspective view of an optical substrate having a combination of structural features within the structured surface, in accordance with one embodiment of the present invention.

Prototype optical substrates in accordance with the present invention have been made that included combinations of transverse prism deformation, peak variance and irregularities, which are computed and well distributed in position and magnitude. FIG. 9a is a SEM photo that shows the wavy prisms and flat irregularities with different sizes. FIG. 9b is a magnified photo of FIG. 9a. FIG. 13 is a schematic perspective view of an optical substrate 77, having laterally wavy prisms (as in FIG. 6a), prism peak height variation (section 79, as in FIG. 7a) and flat irregularities 78 (as in FIG. 8a).

While observing the interference fringes, an upper optical enhancement substrate with straight prism structures (no wavy prism deformation, variance in peak height or flat irregularities) on one side and with a glossy surface on the other side (opposite to the structured surface), is applied. The upper straight prism substrate is stacked above the prototypes of the present invention. Each lower substrate prototype in accordance with the present invention is crossed stacked with the upper straight prism substrate, as was in the computer simulation arrangement. These stacked substrates are illuminated by a backlight as shown in FIG. 10. The interference fringes (bright and dark repeated patterns) are observed from top, light output surface, of the upper straight prism substrate.

Table 1 shows the performance of 9 embodiments of lower substrate prototypes. The interference fringe level is in reference to level 5 of interference fringes (on a scale of 0 to 5) that are present in the reference case of two straight prism enhancement films stacked crossly. Gain is the ratio of luminance of a single embodiment to that of the light guide.

Embodiments 4 and 8 reduce the level from 5 to 1 and 1.5. The other embodiments all eliminate the interference fringes. Embodiment 4 shows that 12 μm deformation mixing with 10.4% flat irregularities can give significant improvement and better performance on interference fringes than that of embodiment 8 which has 25 μm deformation without any irregularities. This indicates that irregularities are useful in diffusing light for eliminating the fringes. However, embodiments 1 to 4 shows that the bigger area of flat irregularities, the lower the gain. In order to maintain gain without acceptable loss, the flat irregularities should be arranged specifically and the range of flat irregularities should be controlled for different requirements of various applications. In general, the effects of the flat irregularities on interference fringes depend on the total area of the flat irregularities, the number, shapes, sizes and locations of the flat irregularities.

TABLE 1

| embodiment | Wavy Prism Transverse Deformation | | variance in peak height(μm) | flat (%) irregularities | Interference fringe level | gain |
| --- | --- | --- | --- | --- | --- | --- |
| | Ave. (μm) | Max (μm) | | | | |
| 1 | 25 | 55 | <10 | 2.1 | 0 | 1.55 |
| 2 | 24 | 48 | <10 | 4.3 | 0 | 1.51 |
| 3 | 26 | 39 | <10 | 8.3 | 0 | 1.46 |
| 4 | 12 | 21 | <10 | 10.4 | 1 | 1.46 |
| 5 | 29 | 54 | <10 | 1.1 | 0 | 1.54 |
| 6 | 28 | 53 | <10 | 2.5 | 0 | 1.54 |
| 7 | 30 | 55 | <10 | 0.1 | 0 | 1.54 |
| 8 | 25 | 38 | <10 | 0 | 1.5 | 1.55 |
| 9 | 28 | 45 | <5 | 0 | 0 | 1.54 |

It is not necessary to have the combination of wave transverse deformation, peak height variance and ratio of irregularities to provide acceptable reduction in interference fringes. For example, the optical substrate may have only transverse deformation without variance in peak height and irregularities. As demonstrated by embodiment 9, a transverse deformation of 28 μm and a small peak height variance, can still eliminate interference fringes without adopting any irregularities. Also, it is anticipated that the effect of eliminating interference fringes still exists, if the peak height variance is reduced to zero, with the presence of at least some flat irregularities.

The structured surface of article of the present invention may be generated in accordance with a number of process techniques, including micromachining using hard tools to form molds or the like for the irregular prismatic profile described above. The hard tools may be very small diamond tools mounted on CNC (Computer Numeric Control) machines (e.g. turning, milling and ruling/shaping machines). Preferably these machines may add some vibration or perturbation generating devices to assist the tools moving with small shifts and making prisms with different level of irregularity. Known STS (Slow Tool Servo), FTS (Fast Tool Servo) and some ultrasonic vibration apparatus are exemplary devices. U.S. Pat. No. 6,581,286, for instance, discloses one of the applications of the FTS for making grooves on an optical film by using thread cutting method. The tool is mounted onto the machine, to create constant peak vertex angle in relation to x-z planes along the y direction within a prism. By using the devices to form surfaces in the mold in relation to increasing degrees of freedom, the structured surfaces of the optical substrate disclosed above can be obtained.

The master may be used to mold the optical article directly or used in electroforming a duplicate of the master, which duplicate is used to mold the optical article. The mold may be in the form of a belt, a drum, a plate, or a cavity. The mold may be used to form the prismatic structure on a substrate through hot embossing of the article, and/or through the addition of an ultraviolet curing or thermal setting materials in which the structures are formed. The mold may be used to form the optical article through injection molding. The substrate or coating material may be any organic, inorganic or hybrid optically transparent material and may include suspended diffusion, bi-refringent or index of refraction modifying particles.

Further discussions of processes for forming a substrate having structured surfaces may be referenced to U.S. Pat. No. 7,618,164, which had been incorporated by reference herein.

In accordance with the present invention, the optical substrate (e.g., 50, 72, 80 and 77) comprises a prismatic, structured light output surface having a combination of laterally meandering longitudinal prisms, predefined, intentionally introduced irregularities, and/or prism peak variations, which together enhances brightness, reduces interference fringes, and masks otherwise user perceivable defects, when applied in an LCD for example. An inventive LCD incorporating the inventive optical substrate in accordance with the present invention may be deployed in an electronic device. As shown in FIG. 11, an electronic 110 (which may be one of a PDA, mobile phone, television, display monitor, portable computer, refrigerator, etc.) comprises the inventive LCD 100 in accordance with one embodiment of the present invention. The LCD 100 comprises the inventive optical substrate described above. The electronic device 110 may further include within a suitable housing, a user input interface such as keys and buttons (schematically represented by the block 116), image data control electronics, such as a controller (schematically represented by block 112) for managing image data flow to the LCD 100, electronics specific to the electronic device 110, which may include a processor, A/D converters, memory devices, data storage devices, etc. (schematically collectively represented by block 118), and a power source such as a power supply, battery or jack for external power source (schematically represented by block 114), which components are well known in the art.

It will be apparent to those skilled in the art that various modifications and variations can be made to the disclosed structures and processes of the present invention without departing from the scope or spirit of the invention. In view of the foregoing descriptions, it is intended that the present invention covers modifications and variations of this invention if they fall within the scope of the following claims and their equivalents.

What is claimed is:

1. An optical substrate, comprising:
   a substrate;
   a light input surface at one side of the substrate; and
   a structured light output surface at an opposite side of the substrate, comprising rows of laterally arranged longitudinal prism structures, wherein each row of longitudinal prism structures meanders laterally, forming laterally deforming sections, wherein each laterally deforming section has a lateral deformation D, and wherein 0 µm<D<40 µm.

2. The optical substrate as in claim 1, wherein 10 µm<D<40 µm.

3. The optical substrate as in claim 1, wherein 20 µm<D<40 µm.

4. The optical substrate as in claim 1, wherein 10 µm<D<30 µm.

5. The optical substrate as in claim 1, wherein 10 µm<D<20 µm.

6. The optical substrate as in claim 1, wherein 20 µm<D<30 µm.

7. The optical substrate as in claim 1, wherein 30 µm<D<40 µm.

8. A flat panel display, comprising:
   a display module displaying an image in accordance with an image data;
   a backlight module providing illumination to the display module; and
   a luminance enhancement module, comprising a first optical substrate as in claim 1, positioned between the display module and the backlight module, enhancing brightness of the illumination to the display module.

9. The flat panel display as in claim 8, wherein the luminance enhancement module further comprises a second optical substrate having a structured light output surface and a light input surface, wherein the structured light output surface of the first optical substrate is positioned adjacent the light input surface of the second substrate, and wherein the optical substrates are crossly aligned about an z-axis, with the longitudinal prism structures of the optical substrates orthogonal to each other.

10. An electronic device, comprising:
    a flat panel display as in claim 1; and
    control electronics directing image data to the flat panel display to render an image in accordance with the image data.

11. An optical substrate, comprising:
    a substrate;
    a light input surface at one side of the substrate; and
    a structured light output surface at an opposite side of the substrate, comprising rows of laterally arranged longitudinal prism structures, wherein each row of longitudinal prism structures meanders laterally, forming laterally deforming sections, wherein each laterally deforming section has a lateral deformation D and a wavelength W, and wherein 0<D/W<0.4.

12. The optical substrate as in claim 11, wherein 0.1<D/W<0.4.

13. The optical substrate as in claim 11, wherein 0.2<D/W<0.4.

14. The optical substrate as in claim 11, wherein 0.1<D/W<0.3.

15. The optical substrate as in claim 11, wherein $0.1<D/W<0.2$.

16. The optical substrate as in claim 11, wherein $0.2<D/W<0.3$.

17. The optical substrate as in claim 11, wherein $0.3<D/W<0.4$.

18. A flat panel display, comprising:
a display module displaying an image in accordance with an image data;
a backlight module providing illumination to the display module; and
a luminance enhancement module, comprising a first optical substrate as in claim 11, positioned between the display module and the backlight module, enhancing brightness of the illumination to the display module.

19. The flat panel display as in claim 18, wherein the luminance enhancement module further comprises a second optical substrate having a structured light output surface and a light input surface, wherein the structured light output surface of the first optical substrate is positioned adjacent the light input surface of the second substrate, and wherein the optical substrates are crossly aligned about an z-axis, with the longitudinal prism structures of the optical substrates orthogonal to each other.

20. An electronic device, comprising:
a flat panel display as in claim 11; and
control electronics directing image data to the flat panel display to render an image in accordance with the image data.

* * * * *